United States Patent [19]

Malecek

[11] 4,078,547
[45] Mar. 14, 1978

[54] SOLAR HEATER AND CONDENSER

[76] Inventor: Jan Malecek, 245 E. 77th St., New York, N.Y. 10021

[21] Appl. No.: 609,187

[22] Filed: Sep. 2, 1975

[51] Int. Cl.² .............................................. F24J 3/02
[52] U.S. Cl. ................................. 126/271; 237/1 A
[58] Field of Search ............... 126/270, 271, 400; 237/1 A; 350/286–291, 299, 300, 310, 259, 292; 62/641

[56] References Cited

U.S. PATENT DOCUMENTS

| 1,325,596 | 12/1919 | Trosper | 126/271 |
| 1,683,266 | 9/1928 | Shipman | 126/271 |
| 3,058,394 | 10/1962 | Edlin | 126/270 |
| 3,964,464 | 6/1976 | Hoekman | 126/271 |
| 3,987,781 | 10/1976 | Nozik | 126/271 |

FOREIGN PATENT DOCUMENTS

| 49,346 | 2/1939 | France | 126/271 |
| 524,943 | 4/1931 | Germany | 126/271 |
| 282,819 | 10/1971 | U.S.S.R. | 126/271 |

Primary Examiner—Kenneth W. Sprague
Assistant Examiner—James C. Yeung
Attorney, Agent, or Firm—Robert D. Farkas

[57] ABSTRACT

A solar heat receiving and utilizing device including a main housing with a Sun-ray receiving window with a main channel into which the heat rays are conducted, and ultimately directed through the channel to outlet windows for heating boilers and similar heat using devices. It uses both one-way influx windows about a main channel, and also glass prisms to conduct the Solar rays and bend them into the main channel. Heat insulating lagging is used around the main housing to block incidental heat escape during conversion from Sun rays to utilizable heat.

3 Claims, 5 Drawing Figures

SOLAR HEATER AND CONDENSER

This invention relates to devices for receiving and utilizing solar heat energy.

SUMMARY OF THE INVENTION

An object of the invention is to provide a novel and improved solar heat energy receiving and utilizing device in which the solar rays are received and converted into useful heat energy.

Another object of the invention is to provide a novel and improved solar heat energy receiving and using device in which there is a main housing with windows for entry of solar rays and including channel means for conducting the heat from the solar rays toward a heat using device such as a boiler, for producing steam.

A further object of the present invention is to provide a novel and improved solar heat energy receiving and using device, in which there is a prismatic adapter for receiving the solar rays and for directing them into a main housing channel on conversion from rays into the state of sensible heat for flowing through a channel to a heat receiving boiler or other heat using device for useful work.

Still another object of the present invention is to provide a novel and improved solar heat energy receiving and using device which is formed of very few parts, and which can be installed in areas of the Earth where the rays of the Sun are sufficiently strong and of persistent duration to provide for economical energy output therefrom.

BRIEF DESCRIPTION OF THE DRAWINGS

The foregoing and other objects, features and advantages of the invention will become apparent from the following description of the drawings, wherein.

BACKGROUND OF THE INVENTION

Figure 1:
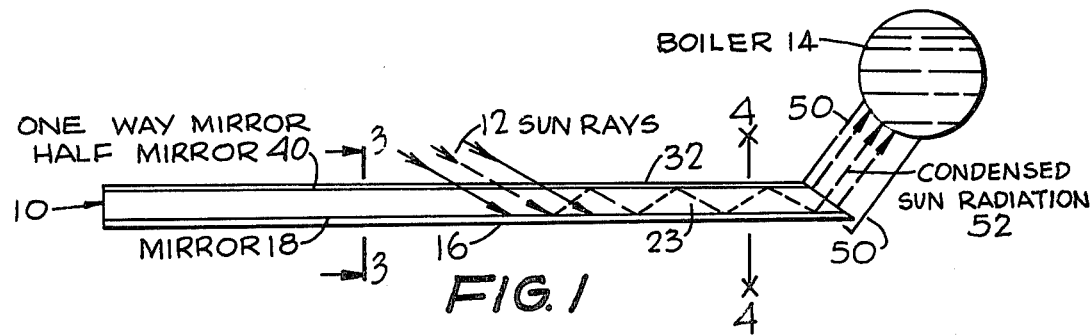
FIG. 1 is a sectional elevational view of the solar heat receiving and using device of the present invention.
Figure 1A:
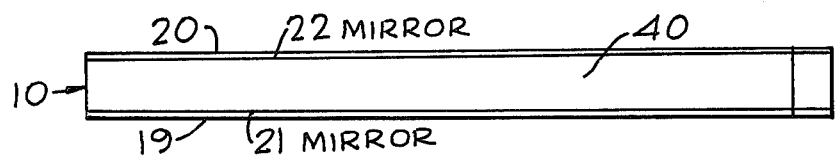
FIG. 1A is a top view of FIG. 1.
Figure 2:
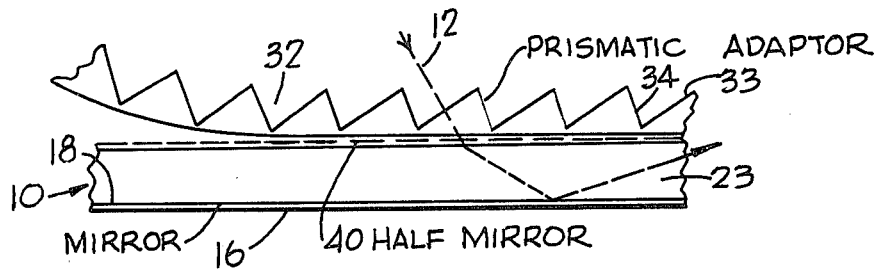
FIG. 2 is a sectional elevational view of a portion of the solar heat receiving device of FIG. 1, including a prismatic adapter.

In connection with the recently publicized energy shortage due to decreased recovery and imports of fossil fuels such as liquid petroleum, it has been seen to be important to resort to use of other sources of heat energy, and this involves the most obvious source, namely the rays of the Sun. While anyone who is exposed to the heat of the Sun in the Summer months, has no difficulty in appreciating the influx of heat from the sun, the problem is of utilizing such rays for useful employment, as in power for machines and the like.

The present invention seeks to provide for such utilization of the rays of the Sun by optimum reception and recovery thereof. This is accomplished by furnishing a good reception mechanism for picking up such rays of the Sun, and for conducting them efficiently to a receptor and utilizing device.

DETAILED DESCRIPTION OF THE PREFERRED EMBODIMENT

In order to understand clearly the nature of the invention, and the best means for carrying it out, reference may be had to the drawings, in which like numerals denote similar parts throughout the several views.

As shown, there is a solar ray receptor main housing 10 which is to be placed in a location on the surface of the Earth or above ground for encounter with the rays 12 of the Sun, for ultimate conduct of heat to a boiler 14 or other utilizing mechanism for such heat, the boiler container a liquid such as water for being boiled to produce useful steam for an engine, generator or the like, or liquid mercury for handling extremely high temperatures for also powering engines, but with more sophisticated arrangements.

The main housing 10 has a floor wall 16 which has a top mirror surface 18, a top half-mirror 40 formed as a roof wall, and side walls 19 and 20 having side mirror surfaces 21 and 22, so as to define a long mirrored chamber or ray passageway 23. Heat lagging or insulating material 24 is applied on the outside of the main housing to block egress of heat therethrough, and this may be of asbestos or other such material. The main housing has a roof half-mirror 40 which may be made of transparent glass or plastic, but if plastic, then having high heat resistance under high temperature conditions, and also if of glass having similarly high heat tolerance characteristics.

The main housing also has a roof wall portion 32 which may be called a prismatic adaptor wall and is formed with sequentially mutually inclined toothed surfaces 33 and 34, for picking up the rays of the Sun and conducting them into the interior of the ray passageway 22. Such rays are bounced back and forth in the mirrored passageway 23, but cannot escape as rays since there is also the mirror coating on the bottom and side walls, aside from the one-way mirror coating at 40.

A simple model may be formed, if desired, consisting of only bottom mirror 18, top half mirror 40 and side mirrors 21 and 22, and may be equipt with the prismatic adaptor 32. Also, if desired, the bottom mirror 18 may be fabricated having an arcuate configuration which approaches the top half mirror 40, at a point remote from the boiler 14.

The prismatic adaptor wall is preferably formed like what is commonly known in the glass art as prism glass, and which is used in illuminating basements to recover as much as possible of incident outside light for being bent to light up the inside of the basement through prismatic refraction. In order to utilize the heat thus received in the form of the transformed heat rays, which is released into the passageway 23, one or more boilers 14 may be connected by ducts 50 formed of any suitable glass or other material so that the heat rays 52 are conducted to the boiler 14 for heating the water or other fluid therein for useful work.

Figure 3:
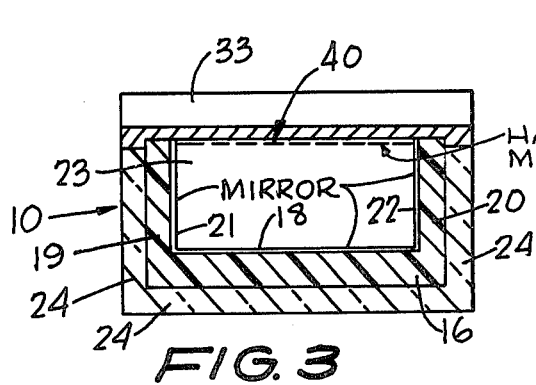
FIG. 3 is a sectional elevational view taken substantially on Plane 3—3 of FIG. 1.
Figure 4:
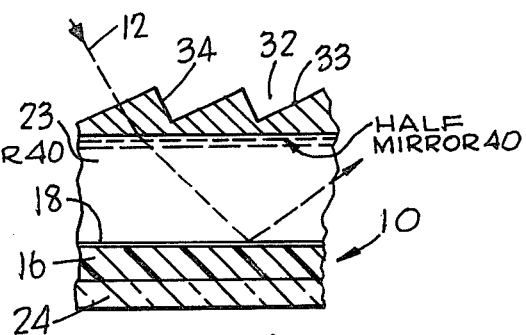
FIG. 4 is a broken sectional elevational view taken substantially on Plane 4—4 of FIG. 1.

While in FIG. 3 the width of the heating conducting channel is indicated as relatively narrow, it is understood that this is only illustrative, and that such channel may be very wide, such as hundreds of feet or meters.

Although the invention has been described in specific terms, it is understood that various changes may be made in size, shape, materials and arrangement without departing from the spirit and scope of the invention as claimed.

What is claimed is:

1. A solar heat receiving and emergizing device comprising main housing means, wall means in said main housing means for defining a main channel chamber, first window means in said main housing means for receiving solar rays from the Sun for said main channel chamber, and outflux means connectable to a heat ray receiving means for utilizing said received solar heat; wherein said main housing means includes reflective mirror means carried by said main housing means for reflecting said solar rays received from the Sun, said reflecting mirror means being disposed on the wall means of said main housing means, and one-way mirror means in said first window means for conducting said solar rays therethrough into said main channel chamber and for flocking return flow of said rays through said one-way mirror means and out of said main channel chamber, heat insulating laggaing means, said heat insulating lagging means carried by said main housing means for blocking substantial heat egress and outflow of heat from said main channel chamber therethrough, and said heat outflux means including heat outflux conduit means connected to said main channel chamber and connectable to a heat utilizing means for transferring the heat contained in said main channel chamber into said heat utilizing means for use thereby.

2. A solar heat device in accordance with claim 1, wherein said heat utilizing means comprises boiler means for receiving heat from said heat outflux conduit means, and fluid means in said boiler means for conversion from a liquid phase to a gaseous and vapor phase under the influence of said heat influx for producing a useful pressure medium.

3. A solar heat device in accordance with claim 2, wherein said first window means comprises prism glass means for receiving said solar rays and for re-directing said rays into and through said main channel chamber for useful work.

* * * * *